July 2, 1968
C. E. ALBERTSON
3,390,750
FRICTION ELEMENT HAVING A LAYER OF POROUS
SINTERED METAL FIBERS
Filed Oct. 25, 1966
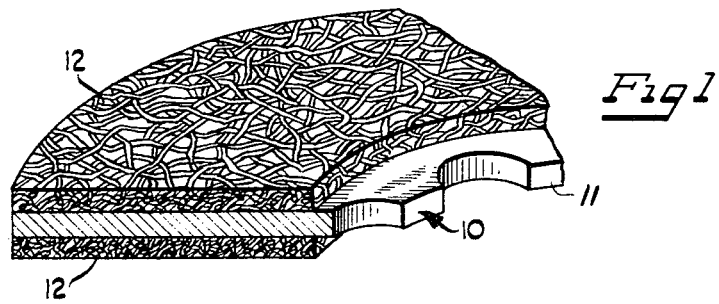
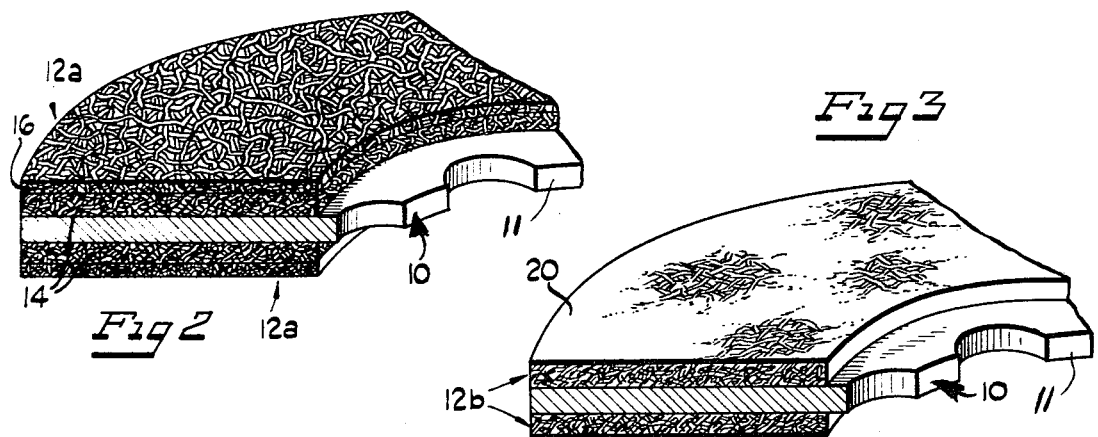
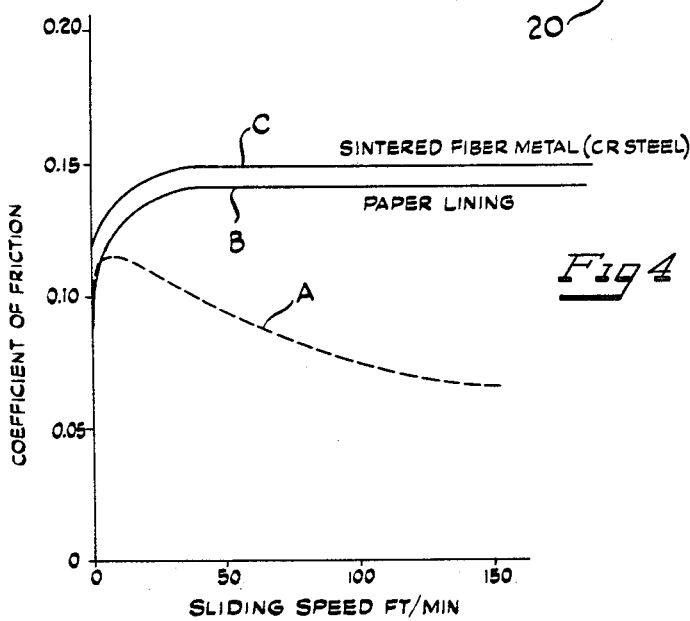
INVENTOR
CLARENCE E. ALBERTSON
BY *Thomas B. Hunter*
ATTORNEY 3,390,750
FRICTION ELEMENT HAVING A LAYER OF POROUS SINTERED METAL FIBERS
Clarence E. Albertson, Villa Park, Ill., assignor to Borg-Warner Corporation, Chicago, Ill., a corporation of Illinois
Filed Oct. 25, 1966, Ser. No. 589,400
6 Claims. (Cl. 192—107)

This invention relates generally to torque control elements, such as friction plates for clutches and brakes, and more particularly to improvements in the wear facing materials or linings for "wet" clutches and brakes.

A typical composite plate for use in a torque transmitting element of the type operating in a "wet" environment, i.e. continuously run in a bath of circulating oil or other lubricant, comprises a rigid, metal disc having a lining or wear facing affixed thereto. For optimum results, it is desirable that the wear facings be made of a friction material which is relatively porous so that they will readily absorb the oil. Under compression, the lubricant is squeezed into the porous wear facings to effect smooth engagement of the friction members and to increase the friction level by dissipating surface oil films.

Although a large number of different materials has been developed for use as wet friction facings, most of such materials which have been commercially successful fall into several general classes. (1) paper based materials incorporating cellulose and/or asbestos fibers in a suitable binder; (2) sintered metal materials; and (3) molded phenolic linings. Examples of these classes of friction materials are described, respectively, in United States Patents 2,733,797, 2,646,151, and 2,553,215.

While the paper based materials are suitable for use in a wet environment because of relatively good frictional characteristics, it has been found that prolonged soaking in oil and subjection to high heat and pressure will weaken the fiber structure. Cellulose fibers begin to degrade at 300° F.; and eventually, the surfaces of the paper-type facings are in such bad condition that they either become abraded and torn or they crack and the facing flakes off. Considerable research has been devoted to extending the service life or paper based materials, such as by dispersing special compositions in the fiber mats and by improving the properties of the binders (usually some type of thermosetting resin). However, they still leave much to be desired from the standpoint of durability.

The sintered metal friction materials mentioned above are usually made by pressing and sintering a predominantly metallic mixture of metallic and non-metallic powders to provide a low porosity mass (less than 50 percent porosity and usually only 20–30 percent porosity). Whereas the paper-type materials exhibit good friction characteristics, but limited durability, the sintered metal elements are often used for heavy-duty applications where high friction temperatures are encountered for appreciable lengths of time. On the other hand, the friction characteristics of such sintered metal facings are poor, and slippage between the friction surfaces often occurs when the sintered metal wear facings have worn smooth. The present invention provides an improved material which obtains the advantages of both the paper type and the sintered metal fraction materials while minimizing their respective disadvantages.

The present invention is directed to an improvement in the facing material which is designed to at least equal the frictional performance of paper based linings, while significantly increasing the resistance to wear and their durability so as to permit their use in heavy-duty transmissions and clutches. The friction elements of the present invention are formed from a material known as sintered fiber metal having a porosity of at least 50 percent to allow the linings to conform to the mating surface. The fiber metal material must be elastic, not dead soft, so it can conform to the mating surface without compacting excessively. A rather low density of sintered metal fibers is required to achieve a degree of conformability.

The material, in a preferred process, is made by (1) providing a slurry of short metal fibers which are drawn or cut from carbon, alloy steel or stainless steel and cut into lengths (approximately 1 to 8 mm. long and 0.001 to 0.005 inch in diameter); (2) felting the slurry into a mat; (3) compacting the mat to the desired density; and (4) sintering the compacted mat in a reducing atmosphere to weld together the juncture points of the fibers and provide a porous material with a relatively high void content. The details of one representative process are more particularly described in British Patent 821,690, published Oct. 14, 1959. The sintered mat is subsequently heat treated, if necessary, to develop the required toughness and resilience.

It is a principal object of the present invention to provide an improved friction facing material, suitable for application in a wet environment, which has improved frictional characteristics and durability at least equivalent to conventional sintered metal friction elements.

Another object of the invention is to provide an improved composite friction facing.

Additional objects and advantages will be apparent from reading the following detailed description taken in conjunction with the drawings wherein:

FIGURE 1 illustrates a clutch plate, partly in section, having friction surfaces formed of sintered metal fiber material containing at least 50 percent voids in accordance with the principles of the invention;

FIGURE 2 is a view similar to FIGURE 1 showing a modified clutch plate;

FIGURE 3 is a view similar to FIGURES 1 and 2 showing another modification of the invention wherein the friction surface is treated with a ceramic coating;

FIGURE 4 as a graph illustrating the comparative frictional properties of a paper based material, a sintered metal material, and the sintered fiber metal material of the present invention.

In order to provide some specific examples illustrating the advantages of the invention, it may be useful to describe in some detail a friction element and the sequence of making it. In FIGURE 1, there is shown a partially broken away projection view of a portion of a typical clutch plate. A metal plate 10, which may be made of bronze, steel, cast iron, or some suitable alloy, is employed as a backing member for the friction elements or facings 12 which are affixed thereto by welding, sintering, brazing or by cementing with phenolic resins, epoxy resins or other suitable adhesives. The sintered metal fiber friction elements are shaped to conform with the surface of the metal backing member 10, which in the example is illustrated as being a generally annular shaped clutch element of a type suitable for use in a multiple-disc clutch pack. The backing member is provided with a plurality of lugs or splines 11 for drivingly connecting it to a driving or driven clutch or brake member. After the metal plate has been chemically or mechanically cleaned, a suitable adhesive or brazing paste is applied either to the friction facing or the plate (or both); and the friction elements are firmly applied to one or both sides of the plate. The plates are then placed in an oven to set the resin and bond (or braze) the facings to the plate. Alternatively, it is possible to sinter the fibers and sinter them to the plate in the same step.

In FIGURE 2, a modification of a clutch plate of the type shown in FIGURE 1 is illustrated. In this embodiment, each of the friction elements or wear facings 12a is formed with plural layers having different densities. Each of the inner layers 14 in contact with the metal backing plate has a relatively high void content and is, therefore, spongy and absorbent. The outer layers 16 are more firmly compacted to provide a relatively dense wear surface which is brought into frictional contact with an adjacent friction element. In a preferred embodiment, the outer surface 16 has a void content of approximately 60 percent while the inner, spongy layer has a void content in excess of 60 percent. Both layers of the material will absorb oil; but the inner layers, being more porous, will hold considerably more oil than the outer layers. Under compression, oil is squeezed and scraped off of the friction surface and diffuses away through the highly porous fiber metal structure to provide exceptionally good frictional properties.

In the embodiment shown in FIGURE 3, the wear facings 12b of a modified friction element are treated to harden and increase the durability of the outer friction surfaces. Various means may be employed to effect a hardening of these outer surfaces, such as by nitriding, carburizing, applying a hard facing or applying a glassy enamel coating to the fibers. For example, it may be desirable to actually apply a separate coating 20 in the form of a dense, hard, ceramic-like enamel. After the sintered fiber metal friction element 12b has been secured to the backing plate 10, an enamel frit 20 may be applied to the friction surfaces in the form of a slurry. The plates are then placed in an oven at a sufficiently high temperature to melt the frit into the interstices of the facings. The frit should be applied in limited quantities so as to prevent sealing off the entire surface of the wear face; otherwise, the absorption of oil into the porous zone underneath the enamel layer would be precluded.

Conventional carbon steels can be made with widely differing characteristics. In other words, they can be manufactured so that they are soft, tough, or brittle, depending upon their thermal history. At temperatures above 1300° F., the structure of the steel begins to change to austenite type. Austenitic steel can be converted to relatively hard and tough Martensite if quenched rapidly; but if cooled at slower rates, or annealed after quenching, the structure will vary from a hard and tough Martensite-Pearlite mixture to a soft, coarse Pearlite. Sintered fiber metal linings made of carbon steels are preferably carburized and then annealed for approximately two hours so that their hardness is within the range of 35 to 50 on a Rockwell C hardness scale.

The type of clutch service (e.g., the rate and amount of work absorbed, surface temperatures, etc.) determines the particular metal and heat treat requirements of the fiber metal friction element. Sintered soft iron or copper fibers do not make a good friction element because they compact, losing the desired porosity; and their performance rapidly approaches that of a dense, sintered powder metal lining. A sintered steel fiber mat, heat treated to Rc 35–50, which is springy, not too soft and not too brittle, is especially suitable for use in automobile automatic transmissions. Tougher, more heat resistant sintered fiber metal clutch linings are required for heavier duty service conditions. Sintered metal fibers, heat treated to a tough, elastic condition, of chrome or molybdenum alloy steels, or of the super alloys can be used in heavy duty applications. Alternatively, steel fibers can be upgraded by diffusion coating with Cr or Mo followed by carburizing to enhance the metal fiber strength. Care should be taken to insure that the diffusion coatings are applied deep enough into the structure to fully strengthen the fibers.

*Example*

Type 430 stainless steel fibers approximately 0.002" O.D. x ¼" long were slurried in a liquid and felted on a disc shaped screen to the size of a commercial clutch lining, 3⅞" I.D. x 5" O.D. x 0.025" thick. The felted discs were dried and then lightly compressed at 400 p.s.i. to flatten and consolidate the felted metal. Two of the consolidated fiber metal discs were assembled, one on each side of a steel core plate, the sandwich compressed to hold the surfaces in intimate contact and sintered at 2400° F. for one hour in a dry, hydrogen atmosphere. The brazed assembly is suitable for use in wet, disc clutches.

The advantages obtained by the use of fiber metal linings in wet clutch applications is demonstrated by reference to FIGURE 4 which illustrates friction vs. sliding speed behavior of representative paper-based, fiber metal and powdered metal linings against a standard 1035 steel pressure plate under conditions found in automatic transmissions, 200° F., 127 p.s.i. load, Type A lubricant, Sohio 506A. Although ambient lube temperatures are closer to 180° F., the lube temperature in the clutch pack is 200° F. and higher.

Sintered, powder metal linings are characterized by a friction vs. sliding speed curve with a negative slope, like the line A in FIGURE 4, of a commercial sintered copper powder automatic transmission clutch lining. Chatter and mechanical vibrations are aggravated by a negative friction vs. sliding speed characteristic of this type. Paper-based linings, designated by curve B, which have a more positive friction vs. sliding speed slope, are much less likely to cause chatter, even with their higher friction level, but have limited heat resistance.

The negative slope appears to be due to the build-up of an oil film as sliding speed increases. The greater porosity and resilience of paper-based linings reduces the build-up of the oil film and the consequent reduction of friction level at higher sliding speeds. In comparison with sintered powder linings, sintered fiber metal linings, as shown by curve C, were found to have a positive friction vs. sliding speed slope and a higher friction level at higher sliding speeds. They were equivalent to paper based linings, curve B, in frictional performance but can stand higher temperatures in transmissions, without degrading.

The sintered, resilient fiber metal linings are less prone to transfer and score than dense powder metal linings for several reasons—lower unit loads are required because of their higher friction level, the resilient linings distribute the load much more uniformly than hard, dense powder metal linings, and the more porous fiber metal linings hold more lubricant, which absorbs more of the frictional heat.

While this invention has been described in connection with certain specific embodiments thereof, it is to be understood that this is by way of illustration and not by way of limitation; and the scope of the appended claims should be construed as broadly as the prior art will permit.

I claim:

1. A torque transmitting element adapted for use in a clutch or brake comprising a rigid backing member and at least one wear facing affixed to said backing member, said backing member having means thereon for coupling said backing member to a driving or driven member of said clutch or brake, said wear facing comprising a porous layer of metal fibers heat treated sufficiently to sinter adjacent fibers directly to one another.

2. A torque transmitting element as defined in claim 1 wherein said wear facing comprises at least two layers of sintered fiber metal, said layers including a first layer of relatively low porosity sintered fiber metal having a friction surface on one side thereof, and a second layer of relatively higher porosity sintered fiber metal affixed to said backing member and interposed between said backing member and said first layer.

3. A torque transmitting element as defined in claim 2 wherein said first layer has a porosity of about 60 percent voids and said second layer has a porosity in excess of about 60 percent voids.

4. A torque transmitting element as defined in claim 1 wherein the metal fibers in said wear facing are coated with a thermosetting resin.

5. A torque transmitting element as defined in claim 1 wherein the metal fibers in said wear facing are plated with a metal harder than the metal from which the fibers are made.

6. A torque transmitting element as defined in claim 1 wherein said wear facing has a friction surface on the side opposite said backing member; and a thin coating of ceramic enamel on said friction surface.

References Cited

UNITED STATES PATENTS

| | | |
|---|---|---|
| 2,251,410 | 8/1941 | Koehring et al. |
| 2,903,787 | 9/1959 | Brennan. |
| 3,114,197 | 12/1963 | Du Bois et al. |
| 3,278,279 | 10/1966 | Kraft et al. |

BENJAMIN W. WYCHE, III, *Primary Examiner.*